United States Patent
Imaizumi et al.

(10) Patent No.: US 9,608,281 B2
(45) Date of Patent: Mar. 28, 2017

(54) CONDUCTIVE INTERCONNECTED POROUS FILM AND METHOD OF PRODUCTION OF SAME

(71) Applicant: FUTAMURA KAGAKU KABUSHIKI KAISHA, Nagoya-shi, Aichi (JP)

(72) Inventors: Takuzo Imaizumi, Aichi (JP); Hiroaki Nagata, Aichi (JP); Naoki Shiba, Aichi (JP)

(73) Assignee: FUTAMURA KAGAKU KABUSHIKI KAISHA, Aichi (JP)

( * ) Notice: Subject to any disclaimer, the term of this patent is extended or adjusted under 35 U.S.C. 154(b) by 94 days.

(21) Appl. No.: 14/355,312

(22) PCT Filed: Nov. 20, 2012

(86) PCT No.: PCT/JP2012/080040
§ 371 (c)(1),
(2) Date: Apr. 30, 2014

(87) PCT Pub. No.: WO2013/084712
PCT Pub. Date: Jun. 13, 2013

(65) Prior Publication Data
US 2014/0329171 A1    Nov. 6, 2014

(30) Foreign Application Priority Data

Dec. 7, 2011 (JP) .................................. 2011-268089
Oct. 30, 2012 (JP) .................................. 2012-238845

(51) Int. Cl.
*H01M 8/0243* (2016.01)
*H01M 8/02* (2016.01)
(Continued)

(52) U.S. Cl.
CPC ........... *H01M 8/0243* (2013.01); *C08J 9/008* (2013.01); *C08J 9/0066* (2013.01); *C08J 9/26* (2013.01);
(Continued)

(58) Field of Classification Search
None
See application file for complete search history.

(56) References Cited

U.S. PATENT DOCUMENTS

| 2002/0175073 A1 | 11/2002 | Nakamura et al. |
| 2010/0129695 A1* | 5/2010 | Im .................... H01M 8/0213 429/514 |

FOREIGN PATENT DOCUMENTS

| EP | 1 139 471 A1 | 10/2001 |
| JP | 2002-097375 A | 4/2002 |

(Continued)

OTHER PUBLICATIONS

International Search Report for the Application No. PCT/JP2012/080040 mailed Feb. 19, 2013.

*Primary Examiner* — Sarah A Slifka
(74) *Attorney, Agent, or Firm* — Cheng Law Group, PLLC

(57) ABSTRACT

A new conductive interconnected porous film, useful as a material for a gas diffusion layer which is used in a solid polymer type fuel cell, which satisfies the requirements of a good conductivity, good gas permeability, surface smoothness, corrosion resistance, and low impurities and which is strong in bending and excellent in handling to an extent not obtainable by existing sheet materials of carbon fiber, that is, a conductive interconnected porous film wherein a resin base material part of a thermoplastic resin has a porous interconnected cell structure which is formed by removal of removable particulate matter and has cells of sizes of 10 μm to 50 μm and wherein the resin base material part is (Continued)

comprised of different particle size particles of first carbon particles of large size carbon particles of a diameter of 5 μm or more and second carbon particles of micro size carbon particles of a diameter of 10 nm or more mixed together, and a method of production of the same.

10 Claims, 5 Drawing Sheets

(51) Int. Cl.
    *C08J 9/26*     (2006.01)
    *H01B 1/24*     (2006.01)
    *C08J 9/00*     (2006.01)
    *H01M 8/10*     (2016.01)

(52) U.S. Cl.
    CPC ............ *H01B 1/24* (2013.01); *H01M 8/0234* (2013.01); *H01M 8/0239* (2013.01); *C08J 2201/03* (2013.01); *C08J 2201/046* (2013.01); *C08J 2201/0464* (2013.01); *C08J 2205/044* (2013.01); *C08J 2205/048* (2013.01); *C08J 2205/05* (2013.01); *C08J 2323/08* (2013.01); *C08J 2323/12* (2013.01); *H01M 2008/1095* (2013.01); *Y02E 60/50* (2013.01); *Y02P 70/56* (2015.11)

(56) References Cited

FOREIGN PATENT DOCUMENTS

| | | |
|---|---|---|
| JP | 2004-288489 A | 10/2004 |
| JP | 2006-143478 A | 6/2006 |
| JP | 2007-314713 A | 12/2007 |
| JP | 2009-144000 A | 7/2009 |
| JP | 2009-231034 A | 10/2009 |
| JP | 2011-094054 A | 5/2011 |

* cited by examiner

CONDUCTIVE INTERCONNECTED POROUS FILM AND METHOD OF PRODUCTION OF SAME

BACKGROUND OF THE INVENTION

1. Field of the Invention

The present invention relates to a conductive interconnected porous film and a method of production of the same, more particularly relates to a conductive interconnected porous film which secures conductivity in a film of a porous resin and a method of production of that conductive interconnected porous film.

2. Description of the Related Art

In a general solid polymer electrolyte fuel cell (PEFC), separators are arranged at both of a fuel electrode which supplies hydrogen (anode) and an air electrode which supplies oxygen (cathode). The two separators grip a membrane electrode assembly between them. This membrane electrode assembly is comprised of a proton conductive film on the two sides of which catalyst layers, water-repelling layers, and further, at the outsides of those, gas diffusion layers are superposed. The gas diffusion layers cause the gas which is supplied from the separator sides to the catalyst layer sides to diffuse to make the concentrations uniform. Therefore, the gas concentration at the membrane electrode assembly becomes constant at all times, uneven reaction is eliminated, and the power generating efficiency rises.

A first property which is demanded from such a gas diffusion layer is that transport of electrons between the separators and catalyst layers not be inhibited, that is, that the conductivity be high. A second is the provision of a good gas permeability convenient for feed of hydrogen and oxygen from the gas channels of the separators to the catalyst layers and, furthermore, discharge of the reaction product of water (steam). A third is surface flatness to prevent layers from unintentionally contacting and causing short-circuits. A fourth is corrosion resistance and electrical stability for sustained battery performance and longer years of use. A fifth is free of impurities as possible for stabilization of performance.

As the material of the gas diffusion layers provided with the above features, porous metal sheets etc. have been proposed, but these are inferior in corrosion resistance. Therefore, a sheet material obtained by mixing a carbon fiber and binder to form a random net structure has been proposed (see WO01/022509, WO01/056103A, Japanese Unexamined Patent Publication No. 2004-288489A, and Japanese Unexamined Patent Publication No. 2006-143478A, etc.) The materials of the gas diffusion layers which are disclosed in these patent literature use carbon fiber, so are excellent in conductivity and corrosion resistance and low in impurities. Further, since the production results in a net structure, the gas permeability is also excellent. From this, sheet materials made by carbon fiber are the mainstream as the materials for gas diffusion layers which are used for the current day solid polymer type fuel cells.

However, the materials made by carbon fiber which are disclosed in the above patent literature are kept down in amounts of addition of binder so as to maintain a high conductivity. Therefore, when formed to 0.1 mm or less, the sheet materials are poor in resistance to shear force. When formed to 0.3 mm or more, the sheet materials are poor in flexibility and difficult to roll up etc. Further, even sheet materials which are formed to 0.1 to 0.3 mm easily crack when bent. In addition, the sheet materials easily shed carbon fibers. In this way, sheet materials made from carbon fiber used as the existing materials of gas diffusion layers are fragile, so are not necessarily high in convenience in handling at the time of production.

Therefore, a new porous material which is provided with conductivity which satisfies the requirements of a good conductivity, good gas permeability, surface smoothness, corrosion resistance, and low impurities and which is strong in bending and excellent in handling has been sought.

As related art, see WO01/022509, WO01/056103A, Japanese Unexamined Patent Publication No. 2004-288489A, and Japanese Unexamined Patent Publication No. 2006-143478A, etc.

SUMMARY OF THE INVENTION

The inventors engaged in intensive studies regarding further utilization of interconnected porous materials made of resin available in the past. As a result, they discovered that interconnected porous materials made of resin can for example be applied to the gas diffusion layers which are used in solid polymer type fuel cells.

The present invention was made in consideration of the above situation and provides a new porous material which is provided with conductivity which satisfies the requirements of a good conductivity, good gas permeability, surface smoothness, corrosion resistance, and low impurities and which is strong in bending and excellent in handling to an extent not obtainable by existing sheet materials of carbon fiber.

That is, the first aspect of the invention relates to a conductive interconnected porous film wherein a resin base material part has a porous interconnected cell structure which is formed by removal of removable particulate matter and wherein the resin base material part is comprised of first carbon particles and second carbon particles of different particle sizes mixed together.

The second aspect of the invention relates to a conductive interconnected porous film of the first aspect wherein the resin base material part is a thermoplastic resin.

The third aspect of the invention relates to a conductive interconnected porous film of the first aspect wherein the porous interconnected cell structure has cells of sizes of 10 μm to 50 μm.

The fourth aspect of the invention relates to a conductive interconnected porous film of the third aspect wherein the cells include at least two types of cells of different sizes.

The fifth aspect of the invention relates to a conductive interconnected porous film of the first aspect wherein the removable particulate matter is comprised of water-soluble particles which are removed by inclusion of water.

The sixth aspect of the invention relates to a conductive interconnected porous film of the first aspect wherein the removable particulate matter is comprised of starch particles which are removed by enzymatic decomposition.

The seventh aspect of the invention relates to a conductive interconnected porous film of the first aspect wherein the first carbon particles are diameter 5 μm or more large size carbon particles, and the second carbon particles are diameter 10 nm or more micro size carbon particles.

The eighth aspect of the invention relates to a conductive interconnected porous film of the seventh aspect wherein the large size carbon particles are carbon fibers.

The ninth aspect of the invention relates to a conductive interconnected porous film of the seventh aspect wherein the large size carbon particles are spherical graphite.

The tenth aspect of the invention relates to a conductive interconnected porous film of the seventh aspect wherein the micro size carbon particles are carbon nanotubes.

The eleventh aspect of the invention relates to a method of production of conductive interconnected porous film characterized by comprising a kneading step of kneading a base material resin, removable particulate matter, and first carbon particles and second carbon particles of mutually different particle sizes to obtain a kneaded resin material, a shaping step of shaping the kneaded resin material into a film-shaped resin shaped article, and a removal step of removing the removable particulate matter from the film-shaped resin shaped article to obtain a cell structure.

Summarizing the advantageous effects of the invention, according to the conductive interconnected porous film according to the first aspect of the invention, since the resin base material part has a porous interconnected cell structure which is formed by removal of removable particulate matter and since the resin base material part is comprised of first carbon particles and second carbon particles of different particle sizes mixed together, it is possible to obtain a new porous material which is provided with conductivity which satisfies the requirements of a good conductivity, good gas permeability, surface smoothness, corrosion resistance, and low impurities and which is strong in bending and excellent in handling to an extent not obtainable by existing sheet materials of carbon fiber.

According to the conductive interconnected porous film according to the second aspect of the invention, since there is provided the first aspect of the invention wherein the resin base material part is a thermoplastic resin, it is possible to provide corrosion resistance and flexibility and further to raise the fluidity by heating and melting.

According to the conductive interconnected porous film according to the third aspect of the invention, since there is provided the first aspect of the invention wherein the porous interconnected cell structure has cells of sizes of 10 μm to 50 μm, it is possible to obtain gas permeation and diffusion and maintain the strength of the film itself.

According to the conductive interconnected porous film according to the fourth aspect of the invention, since there is provided the third aspect of the invention wherein the cells include at least two types of cells of different sizes, it is possible to improve not only the permeation performance of a gas etc. due to the porosity, but also the diffusion performance.

According to the conductive interconnected porous film according to the fifth aspect of the invention, since there is provided the first aspect of the invention wherein the the removable particulate matter is comprised of water-soluble particles which are removed by inclusion of water, the removal is extremely simple.

According to the conductive interconnected porous film according to the sixth aspect of the invention, since there is provided the first aspect of the invention wherein the removable particulate matter is comprised of starch particles which are removed by enzymatic decomposition, it is possible to easily remove the starch particles.

According to the conductive interconnected porous film according to the seventh aspect of the invention, since there is provided the first aspect of the invention wherein the first carbon particles are diameter 5 μm or more large size carbon particles, and the second carbon particles are diameter 10 nm or more micro size carbon particles, it is possible to make use of the characteristics of the two types of carbon particles with different particle sizes while obtaining gas permeability and conductivity in the film having a resin base material part as well.

According to the conductive interconnected porous film according to the eighth aspect of the invention, since there is provided the seventh aspect of the invention wherein the large size carbon particles are carbon fibers, stabilization of the performance becomes easy.

According to the conductive interconnected porous film according to the ninth aspect of the invention, since there is provided the seventh aspect of the invention wherein the large size carbon particles are spherical graphite, this acts to lower the resistivity of the film itself.

According to the conductive interconnected porous film according to the tenth aspect of the invention, since there is provided the seventh aspect of the invention wherein the micro size carbon particles are carbon nanotubes, stabilization of the performance becomes easy.

According to the method of production of a conductive interconnected porous film according to the eleventh aspect of the invention, since there are provided a kneading step of kneading a base material resin, removable particulate matter, and first carbon particles and second carbon particles of mutually different particle sizes to obtain a kneaded resin material, a shaping step of shaping the kneaded resin material into a film-shaped resin shaped article, and a removal step of removing the removable particulate matter from the film-shaped resin shaped article to obtain a cell structure, it is possible to establish a method of production of a new porous material which is provided with conductivity which satisfies the requirements of a good conductivity, good gas permeability, surface smoothness, corrosion resistance, and low impurities and which is strong in bending and excellent in handling to an extent not obtainable by existing sheet materials of carbon fiber.

DESCRIPTION OF THE PREFERRED EMBODIMENTS

Figure 1:
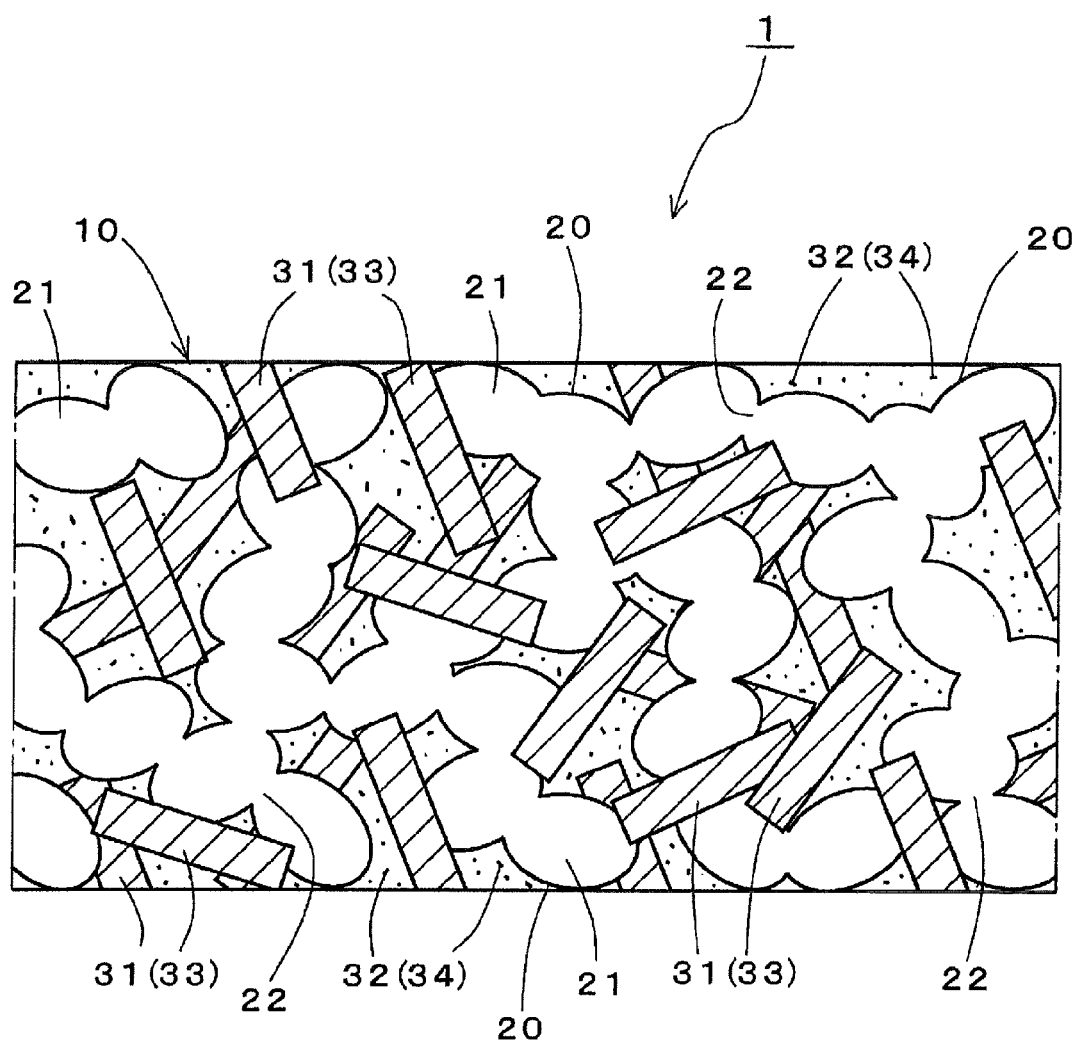
FIG. 1 is a cross-sectional schematic view of a conductive interconnected porous film of the present invention.

The conductive interconnected porous film 1 in the present invention, as will be grasped from the cross-sectional schematic view of FIG. 1, is formed by a resin base material part 10. At the inside of the resin base material part 10, a porous interconnected cell structure 20 which has connecting parts 22 is formed. The porous interconnected cell structure 20 opens at the surface of the conductive interconnected porous film 1. Furthermore, as two types of carbon particles with mutually different particle sizes, first carbon particles 31 (first carbon material) and second carbon particles 32 (second carbon material) are mixed in the resin base material part 10. This film 1 is provided with the resin base material part 10 which is formed in a sponge form and has first carbon particles 31 and second carbon particles 32 buried in the resin part of the resin base material part 10.

Therefore, the conductive interconnected porous film is provided with a flexibility which is derived from the resin base material part and a gas permeability of the porous interconnected cell structure which opens at the two surfaces of the film and, further, has a conductive performance derived from the carbon particles.

The resin base material part 10 which forms the structural material of the conductive interconnected porous film 1 is selected from thermoplastic resins. A resin material is suitable in the point that it is provided with corrosion resistance and imparts flexibility to the film. Furthermore, by making the material a thermoplastic resin, the fluidity rises upon heating and melting. Due to this, uniform diffusion of the removable particulate matter 25, first carbon particles 31, and second carbon particles 32 becomes possible and, furthermore, the later explained shaping also becomes easy.

As the thermoplastic resin, an ethylene homopolymer, propylene homopolymer, random copolymer of ethylene and propylene, 1-butene, 1-pentene, 1-hexene, 4-methyl-1-pentene, or other one or more types of α-olefins or a block copolymer of that composition may be mentioned. Furthermore, mixtures of these polymers and other polyolefin-based resins, petroleum resins and terpene resins and other hydrocarbon-based resins may be mentioned. In addition, fluororesins and other resins which are excellent in corrosion resistance may be selected. The various resins which are listed are the base material resins in the method of production of a conductive interconnected porous film.

For example, if assuming a gas diffusion layer of a solid polymer type fuel cell, a thermoplastic polyolefin resin or fluororesin is preferably used. Polyester resins include ester bonds, while polyamide resins include amide bonds, so it is believed that they are susceptible to deterioration due to the effects of the sulfone groups and other acid groups of the catalyst layer.

The porous interconnected cell structure 20 which is formed at the inside of the resin base material part 10 is comprised of a plurality of cells 21 of suitable particle-derived shapes which contact each other and are randomly connected. The removable particulate matter 25 which is present in the resin base material part 10 (see later explained FIG. 3) is removed after the fact whereby the plurality of cells 21 are formed. Between the mutually contacting cells 21, connecting parts 22 with no resin base material parts 10 present are formed. The cells 21 are connected whereby a porous interconnected cell structure 20 is formed. Around the removable particulate matter 25 near the surface of the conductive interconnected porous film 1, there are parts where the resin base material part 10 is thin and parts where it is not present and the removable particulate matter 25 is exposed. For this reason, openings formed by the cells 21 appear at the surface of the conductive interconnected porous film 1.

Due to the random connection of the cells 21, good gas permeation from one surface side to the other surface side of the conductive interconnected porous film 1 is secured. At the same time, by passing through the cells 21 of the film 1, the diffusion of the gas is also raised. Therefore, considering the gas permeation and diffusion and maintaining the strength of the film itself, the porous interconnected cell structure 20 is formed with cells 21 of sizes of 10 µm to 50 µm.

As a simple method for easy removal of removable particulate matter 25 from the resin base material part 10, there is dissolution in water. The resin base material part 10 including the removable particulate matter 25 is impregnated by water. In this case, the removable particulate matter 25 is selected from water-soluble particles, for example, crystals of saccharides, crystals of glucose, rock sugar, sugar cubes (solidified masses of sugar), etc. In the case of crystals of salts, there are crystals of sodium chloride, crystals of alum, crystals of potassium nitrate, etc. Further, limestone which is crushed and sieved into predetermined particle sizes or calcium carbonate crystals may also be mentioned. Therefore, when dissolved in water, dissolution using dilute hydrochloric acid is also added.

With the above-explained water-soluble particles, the wear and shape at the time of handling vary. That is, the individual cells 21 which form the porous interconnected cell structure 20 should be as uniform in size as possible. Further, the individual cells are desirably made rounded shapes. To meet these demands, starch particles are used as the removable particulate matter 25. Starch particles are crystals of the polysaccharide compounds that plants produce. The form and size of the starch particles range, depending on the plant species, from about 1 to 100 µm in particle size. While depending on the type of plant, the particle size is relatively uniform. This is perfect in making the removable particulate matter homogeneous. For example, particles of potato starch are oval shaped with average particle sizes of about 20 to 40 µm, while corn starch, green beans, tapioca starch, etc. have average particle sizes of about 10 to 15 µm.

The type and amount of the starch particles are defined while considering the thickness of the conductive interconnected porous film and the size of the carbon particles to be mixed in. Note that the starch particles may be single types or a plurality of types of starch particles may be mixed for use.

However, starch particles are hard to completely remove by dipping the film in cold water or hot water as it is. Therefore, to facilitate removal from the resin base material part 10, an enzyme is added to the cold water or hot water. The removable particulate matter 25 of the starch particles is broken down by the enzyme and then removed (enzymatic decomposition). That is, the correspondence between the removable particulate matter and enzyme depends on the specific natures of the substrates between the two. Due to this, for the enzyme, α-amylase, β-amylase, and in addition pullulanase etc. are selected.

As a feature of the conductive interconnected porous film 1 of the present invention, two types of carbon particles (first carbon particles 31 and second carbon particles 32) of different particle sizes are dispersed and mixed inside the resin base material part 10. The first carbon particles 31 are large particles of a particle size 100 times to 1000 times that of the second carbon particles 32.

More particularly, the first carbon particles 31 are diameter 5 µm to 150 µm or so large size carbon particles 33 (large carbon material), while the second carbon particles 32 are diameter 10 nm to 150 nm or so micro size carbon particles 34 (micro size carbon material). As shown in the schematic view of FIG. 1, the large size carbon particles 33 and the micro size carbon particles 34 are randomly present inside the resin base material part 10. Whatever the size of the carbon particles, the reason for using two types of carbon particles with extremely different particle sizes is the results of the later explained examples.

Regarding this reason, it is believed as follows: If mixing only micro size carbon particles 34 in the resin base material part 10, since the micro size carbon particles 34 themselves are large in surface are, the viscosity easily rises when kneaded with the base material resin. Therefore, even if trying to increase the amount of the micro size carbon particles 34 for the purpose of improving the conductivity of the resin base material part, it is difficult. Further, when mixing only large size carbon particles 33 in the resin base material part 10, it is possible to increase the amount per weight compared with micro size carbon particles 34. However, the space between large size carbon particles 33 becomes greater. Portions of only the poorly conductive resin base material part 10 also appear at the film surface. Therefore, there are limits to improvement of the conductivity.

Thus, both large size carbon particles 33 and micro size carbon particles 34 were mixed in to deal with the above limitations. The large size carbon particles 33 of the conductive interconnected porous film 1, while depending on the amount, can approach and contact each other, so act as connecting portions (conductive portions) in the resin base material part and can raise the conductivity. Further, in the resin base material part 10 at other than the large size carbon particles 33, there are micro size carbon particles 34, so it is possible to keep down the drop in conductivity of the resin base material part. Therefore, it is possible to make use of the properties of the two types of carbon particles with the different particle sizes while obtaining gas permeability and conductivity at the film which has the resin base material part.

The large size carbon particles 33 and micro size carbon particles 34 can be made using a broad range of materials so long as materials giving rise to the above difference in particle sizes. Among them, for stabilization of the performance, carbon particles which relatively match in particle size and shape are used. Therefore, as large size carbon particles 33, carbon beads, spherical graphite, and, furthermore, carbon fiber are used. Regarding the large size carbon particles 33, the closer to the true density of graphite of 2.26 g/cm$^3$, the better the conductivity. For this reason, the true density is 2.0 g/cm$^3$ or more, more preferably 2.2 g/cm$^3$ or more. Further, as the micro size carbon particles 34, carbon nanotubes or carbon black is used.

Figure 2:
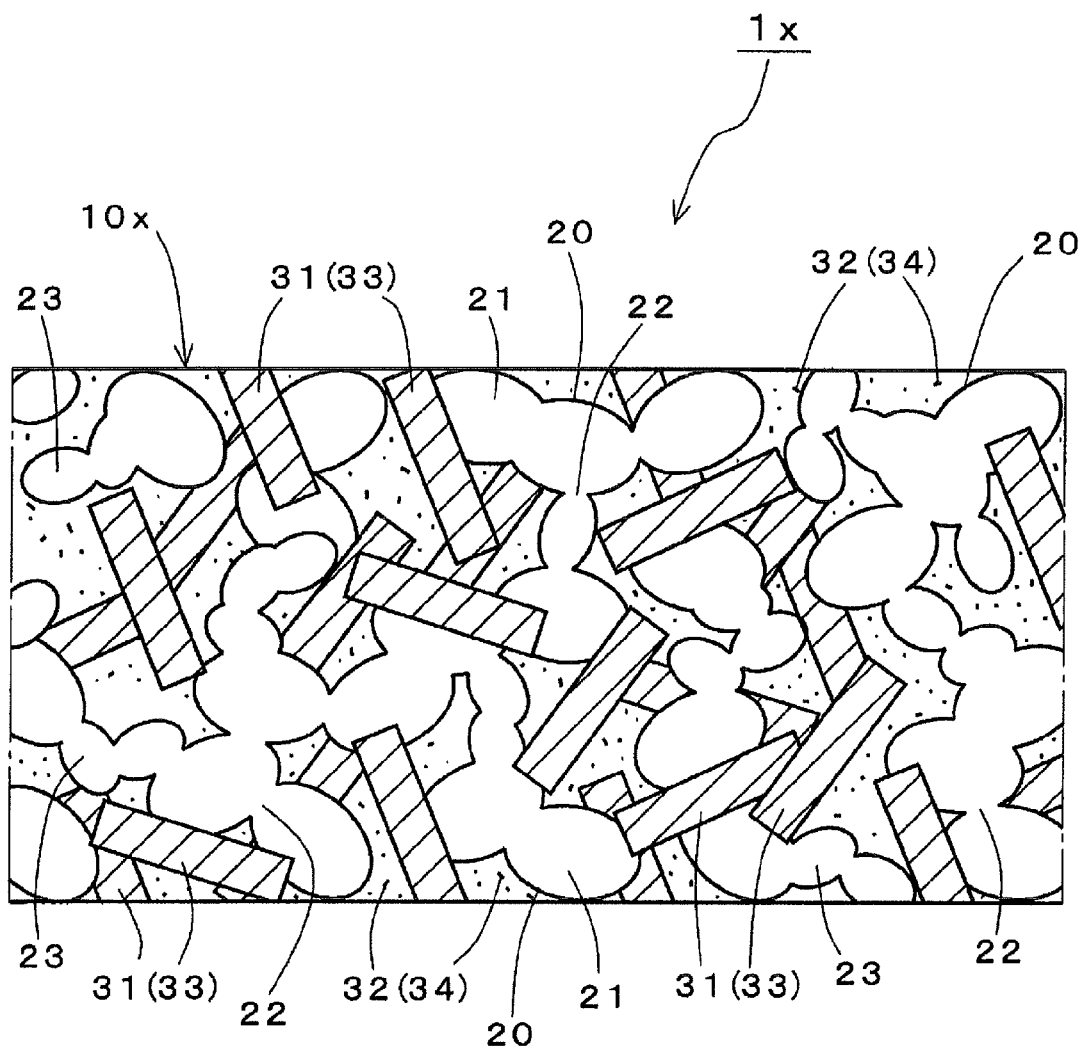
FIG. 2 is a cross-sectional schematic view of another conductive interconnected porous film.

FIG. 2 is a cross-sectional schematic view of a conductive interconnected porous film 1x constituting another embodiment. As shown by the internal structure of the resin base material part 10x of the illustrated example, cells 21 and small cells 23 smaller in size (cell diameter) that those cells 21 are formed. The cells 21 and the small cells 23 are derived from the removable particulate matter of different particle sizes. For example, this can be realized by use of starch particles of different particle sizes. The cells 21 together, the small cells 23 together, or the cells 21 and the small cells 23 are joined with each other whereby the connecting parts 22 are formed.

The resin base material part 10x of the conductive interconnected porous film 1x also has two types of carbon particles of mutually different particle sizes (first carbon particles 31 and second carbon particles 32) mixed into it. In the illustration, the large size carbon particles 33 of the first carbon particles 31 are carbon fibers, while the micro size carbon particles 34 of the second carbon particles 32 are carbon nanotubes. The conductive action of the conductive interconnected porous film 1x is similar to that of the above-mentioned conductive interconnected porous film 1 (see FIG. 1).

The advantages in forming cells with different sizes are considered to be as follows. When gas permeates from one surface side to the other surface side of a conductive interconnected porous film 1x (resin base material part 10x), due to the variation in size of the cells, the permeation of gas inside of the film becomes complicated. For example, there is the movement time, movement distance, etc. of the gas. For this reason, the gas can permeate through the film while diffusing inside it more. Therefore, in addition to the gas permeation performance due to the porous structure, a gas diffusion performance is also given.

Figure 3:
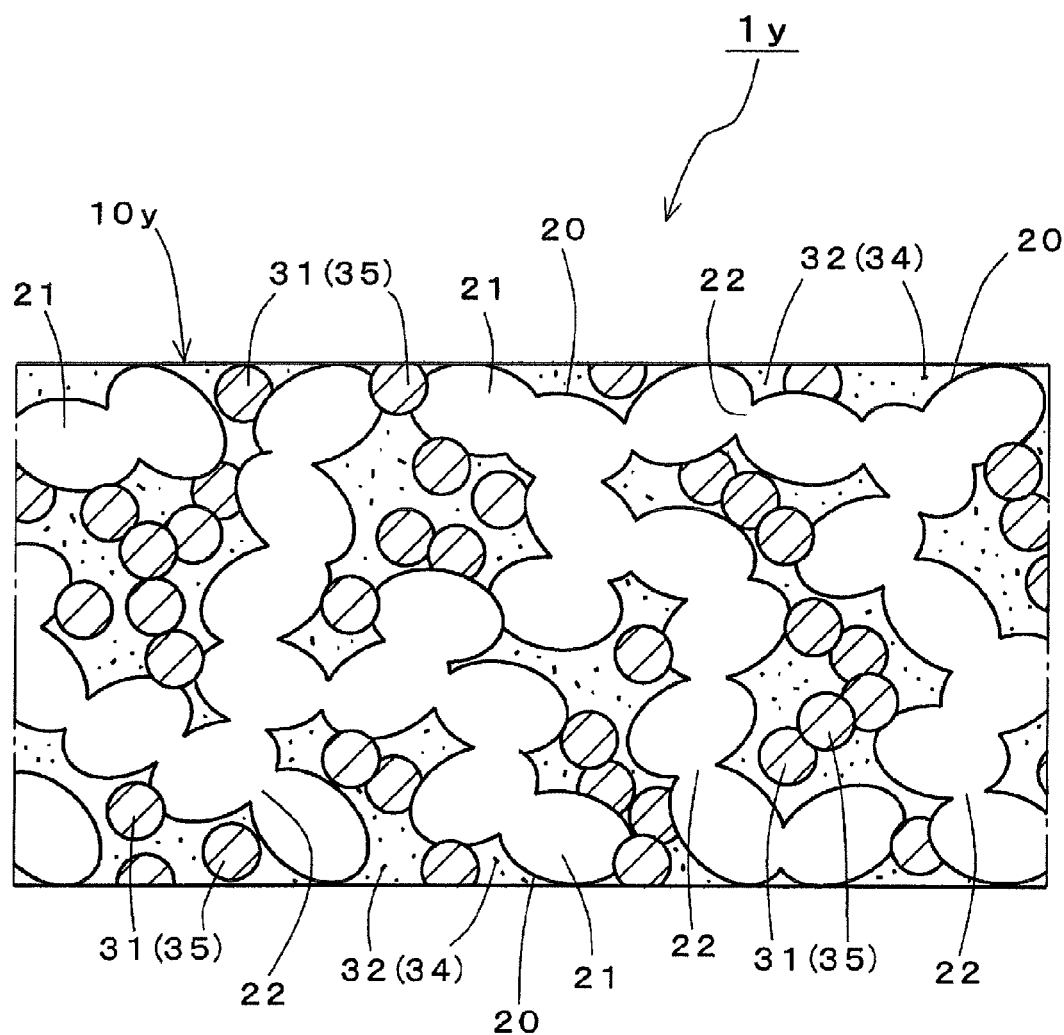
FIG. 3 is a cross-sectional schematic view of still another conductive interconnected porous film.

FIG. 3 is a cross-sectional schematic view of a conductive interconnected porous film 1y according to still another embodiment. As shown by the resin base material part 10y of the illustrated example, two types of carbon particles (first carbon particles 31 and second carbon particles 32) of mutually different particle sizes are mixed. The first carbon particles 31 are large size carbon particles 35 comprised of carbon beads or spherical graphite. The second carbon particles 32 are micro size carbon particles 34 comprised of carbon nanotubes.

Inside of the resin base material part 10y, cells 21 are formed. The cells are connected with each other by connecting parts 22. The action on the gas permeability at the conductive interconnected porous film 1y is similar to that of the above-mentioned conductive interconnected porous film 1 (see FIG. 1).

When using particulate matter which is closer to spheres in shape as the large size carbon particles, the flexibility becomes smaller compared with use of carbon fiber, so the flexibility and ease of bending of the conductive interconnected porous film falls somewhat compared with the film of FIG. 1 and FIG. 2. However, this contributes to a drop in the resistivity of the film (see later explained examples). For this reason, if considering the application, applied location, environment, etc., an effective film can be obtained.

Figure 4:
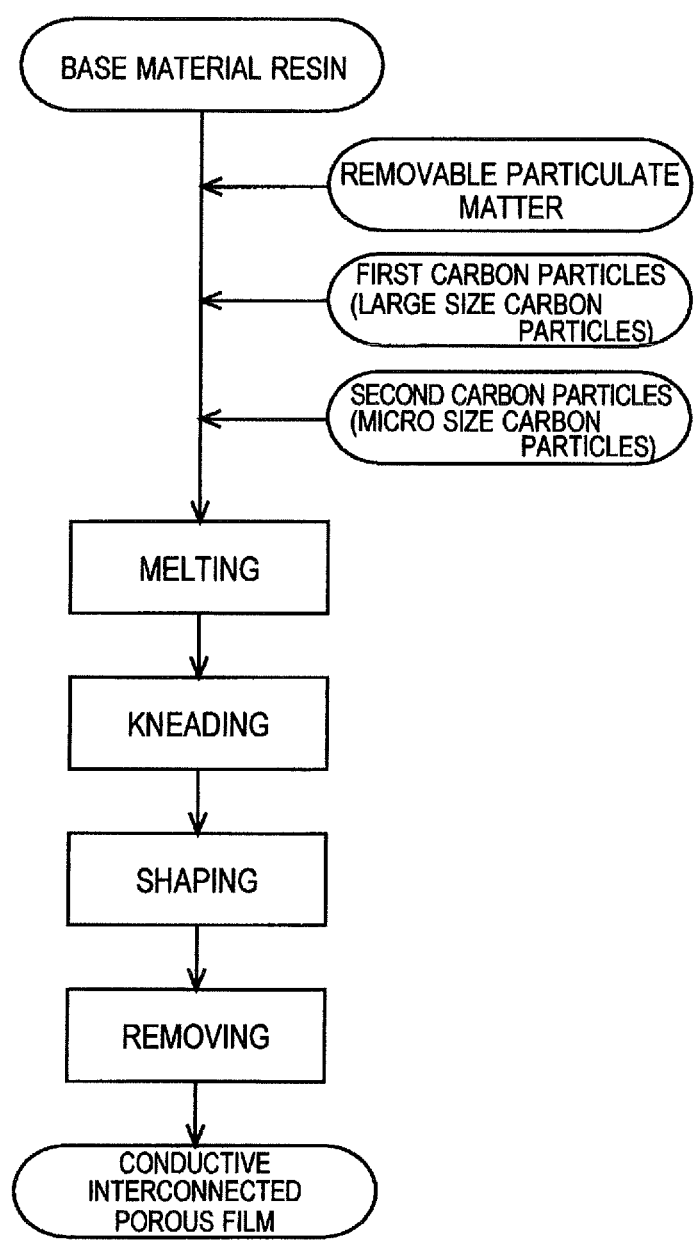
FIG. 4 is a schematic process diagram which explains a method of production of the present invention.
Figure 5:
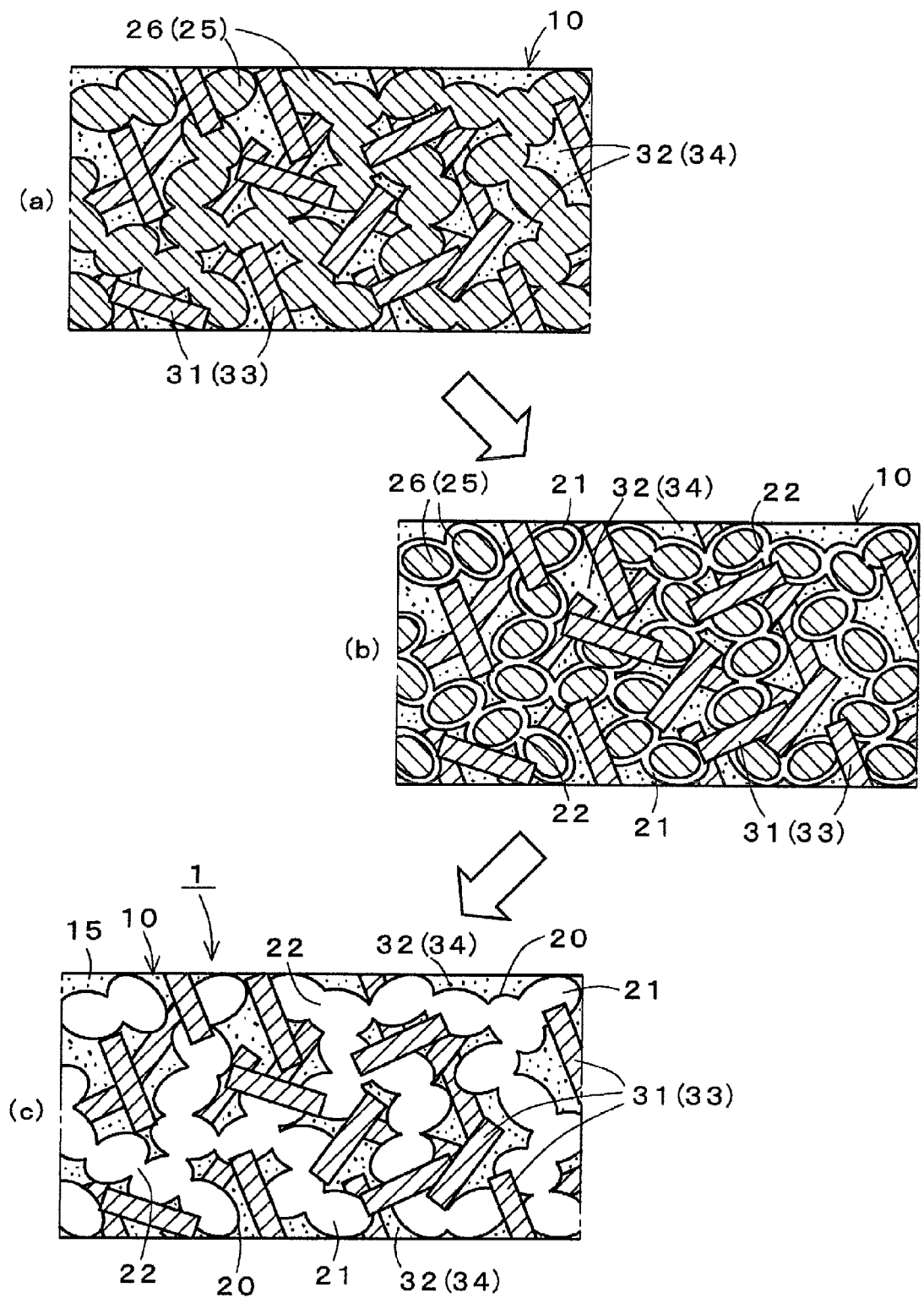
FIG. 5 is a schematic view which further explains the removal step of FIG. 4.

Next, using the schematic flowchart of FIG. 4 and the schematic view of FIG. 5, the method of production of the conductive interconnected porous film 1 which is disclosed mainly in FIG. 1 will be explained. Note that, names in common show the same materials as before. The method of production of the conductive interconnected porous films 1x and 1y of FIG. 2 and FIG. 3 are also substantially the same.

First, the base material resin which forms the resin base material part is charged with the removable particulate matter and the first carbon particles and second carbon particles with the mutually different particle sizes in respective predetermined amounts. The first carbon particles correspond to the large size carbon particles, while the second carbon particles correspond to the micro size carbon particles. The base material resin is heated up to the melting temperature to become fluid. Further, the removable particulate matter, first carbon particles (large size carbon particles), and second carbon particles (micro size carbon particles) are sufficiently kneaded until they uniformly diffuse into the molten state base material resin and form the kneaded resin material ("kneading step"). In the kneading, a known blender or kneader etc. which can melt a material by heating is used. Therefore, for the base material resin, for ease of heating and melting, a thermoplastic resin is selected. In particular, from the viewpoint of the corrosion resistance and flexibility, a polyolefin resin or a fluororesin is selected.

Next, the kneaded resin material is shaped into a film of a suitable thickness to form a film-shaped resin shaped article ("shaping step"). The base material resin has micro size carbon particles mixed into it, so the kneaded resin material itself easily rises in viscosity. Due to this, as the method for forming the film, extrusion, press forming, cold isostatic pressing (CIP), tape casting, and other suitable known shaping techniques in the resin working field may be employed. For example, there are the T-die method, tubular method, and calender method.

Further, the removable particulate matter which is buried in the film-shaped resin shaped article is removed and disappears from the inside, whereby it is possible to obtain a cell structure which has a porous interconnected cell structure ("removing step"). After that, the cell structure is washed, dried, cut, to obtain a conductive interconnected porous film.

When the removable particulate matter is a crystal of a saccharide or salt, the film-shaped resin shaped article is sprayed with water or dipped in it to dissolve and remove the removable particulate matter. While referring to the schematic view of the removal step of FIG. 5, the case where the removable particulate matter is starch particles will be further explained.

FIG. 5(a) shows the film-shaped resin shaped article 11 which is obtained by shaping the kneaded resin material. Since this is before the removal step, in the figure, there is removable particulate matter constituted by the starch particles 26 (removable particulate matter 25). The film-shaped resin shaped article 11 is dipped in a water bath which contains the above-mentioned amylase or other enzyme for breaking down the starch. In the water bath, the article is warmed to a temperature region suitable for an enzymatic reaction. For this reason, as shown in FIG. 5(b), due to the enzyme action, the starch particles are broken down and gradually shrink in size. Further, as shown in FIG. 5(c), the substrate constituted by the starch is completely broken down and the starch particles 26 of the removable particulate matter disappear. As a result, the locations where there were initially starch particles 26 become the cells 21. The porous interconnected cell structure 20 is formed by connection of the cells 21 with each other. The remaining parts become a cell structure 15. After that, the material is washed, dried, cut, etc. whereby the conductive interconnected porous film is completed.

Due to the need to make the individual cells 21 contact each other to finally form the porous interconnected cell structure 20, for example, when making the removable particulate matter from starch particles, the starch particles are added to extents whereby they account for about 30 wt % to 60 wt % of the weight of the base material resin.

In the conductive interconnected porous film, inside of the resin base material part (base material resin), a porous interconnected cell structure and carbon particles for giving conductivity are present. For this reason, due to the resin, the film is strong against bending deformation and the convenience in handling and the workability are remarkably improved. Further, as disclosed in the method of production as well, even when employing starch particles as the removable particulate matter of the relatively even size, enzymatic decomposition (zymolysis) may be used to form a porous structure under moderate conditions.

EXAMPLES

The inventors used the following materials and used the formulations disclosed in the later explained tables as the basis to prepare Prototype Examples 1 to 20 of conductive interconnected porous films. Further, they measured the films for thickness, bending resistance, gas permeability, and resistivity and made overall evaluations of the quality of the performance provided by the conductive interconnected porous films.

Materials Used

As the base material resin, the following materials were used:
Linear low density polyethylene (made by Ube Maruzen Polyethylene, Umerit 631J (melting point 121° C.)) (below, abbreviated as "LLDPE")
Polypropylene (made by Japan Polypropylene Corporation, FW4B (melting point 138° C.) (below, abbreviated as "PP (1)")
Polypropylene (made by Japan Polypropylene Corporation, FY4 (melting point 165° C.) (below, abbreviated as "PP(2)")
Thermoplastic fluororesin (made by Sumitomo 3M, Dyneon THV500G (melting point 165° C.))
For each base material resin, resin pellets were frozen and crushed to obtain powder for use.

As the first carbon particles, the following materials were used:
"First carbon particles (large size carbon particles)" Carbon fiber
Made by Mitsubishi Resin, Dialead K223SE (denier: 11 µm, true density: 2.0 g/cm$^3$) (below, abbreviated as "carbon fiber (1)"), same company, Dialead K223HE (denier: 11 µm, true density: 2.2 g/cm$^3$) (below, abbreviated as "carbon fiber (2)").
Carbon Beads
Made by Nippon Carbon, Nicabeads ICB0520 (average particle size: 5 µm, true density: 1.35 to 1.40 g/cm$^3$), same company, Nicabeads ICB2020 (average particle size: 20 µm, true density: 1.35 to 1.40 g/cm$^3$), same company, Nicabeads ICB15020 (average particle size: 150 µm, true density: 1.35 to 1.40 g/cm$^3$)
Spherical Graphite
Made by Nippon Carbon, Nicabeads P10B-ZG (average particle size: 10 µm, true density: 2.17 g/cm$^3$), same company, Nicabeads P25B-ZG (average particle size: 25 µm, true density: 2.17 g/cm$^3$)
As the second carbon particles, the following materials were used:
"Second carbon particles (micro size carbon particles)"
Carbon nanotubes (made by Showa Denko, VGCF-X (denier: 10 to 15 nm), made by same company, VGCF-H (denier: 150 nm)), Carbon black (made by Lion, Ketjenblack EC600JD (particle size: 34 nm))
"Other Materials"
As removable particles, potato starch (particle size about 20 to 40 µm) and tapioca starch (particle size about 10 to 15 µm) were used. Both were made by Tokai Starch. As the enzyme for removing the starch particles, α-amylase (made by Amano Enzyme, Kleistase T5) was used.
The "ratio (wt %)" in the table shows the percents by weight of the "base material resin/first carbon particles/second carbon particles/removable particles" in that order (total 100 wt %). "0" indicates not added. Note that in the preparation of the prototype examples, for convenience of explanation, "parts by weight" are used.

Prototype Example 1

A base material resin constituted by LLDPE which was frozen and crushed to a powder was used. A twin-screw kneading extruder which was equipped with a T-die was charged with LLDPE: 22 parts by weight, carbon fiber (1): 21 parts by weight, carbon nanotubes: 10 parts by weight, and potato starch: 47 parts by weight. The mixture was heated to 140° C. to melt the base material resin. The ingredients were kneaded until uniformly dispersed to prepare the kneaded resin material. The kneaded resin material was extruded by the T-die, then immediately introduced between two metal rollers to form it into a film shape. This was cooled to obtain a film-shaped resin shaped article.

The film-shaped resin shaped article was dipped for 1 hour in a 90° C. hot water bath which contained α-amylase in 1 wt % and was adjusted to pH 6.0, then was dipped for 5 minutes in a 40° C. ultrasonic bath and was further washed with running water for 1 minute. After finishing being rinsed, the article was dried in an 80° C. dryer for 24 hours. In this way, the conductive interconnected porous film of Prototype Example 1 (thickness 1000 μm) was prepared.

Prototype Example 2

In Prototype Example 2, a film-shaped resin shaped article the same as in Prototype Example 1 was run through a calender roll machine which was set to a line pressure of 2 t/cm and heated to 100° C. to roll it and thereby obtain a film-shaped resin shaped article. The removable particles were removed in the same way as Prototype Example 1. In this way, the conductive interconnected porous film of Prototype Example 2 (thickness 170 μm) was prepared.

Prototype Example 3

In Prototype Example 3, a film-shaped resin shaped article the same as in Prototype Example 1 was used and run through a calender roll machine under conditions similar to Prototype Example 2 to roll it and obtain a film-shaped resin shaped article. The removable particles were removed in the same way as Prototype Example 1. In this way, the conductive interconnected porous film of Prototype Example 3 (thickness 80 μm) was prepared.

Prototype Example 4

In Prototype Example 4, the materials were made the same as in Prototype Example 1 and only the amounts were changed. Otherwise, the same procedure was followed for preparation. Further, the conductive interconnected porous film (thickness 800 μm) of Prototype Example 4 was prepared.

Prototype Example 5

In Prototype Example 5, the carbon nanotubes in the kneaded resin material of Prototype Example 1 were changed to the same amount of carbon black to prepare the kneaded resin material which was then extruded by the T-die to obtain a film-shaped resin shaped article. Further, after this, the same procedure was followed as in Prototype Example 2 to roll the material by a calender roll machine and remove the removable particles. In this way, the conductive interconnected porous film of Prototype Example 5 (thickness 80 μm) was prepared.

Prototype Example 6

In Prototype Example 6, the carbon fiber (1) in the kneaded resin material of Prototype Example 1 was omitted in the formulation to prepare the kneaded resin material. The subsequent shaping and removal of removable particles were performed in the same way as Prototype Example 1. In this way, the conductive interconnected porous film of Prototype Example 6 (thickness 400 μm) was prepared.

Prototype Example 7

In Prototype Example 7, the potato starch of the removable particles in the kneaded resin material of Prototype Example 1 was deleted from the formulation to prepare the kneaded resin material. The subsequent shaping was performed similar to Prototype Example 1. In this way, the conductive interconnected porous film of Prototype Example 7 (thickness 300 μm) was prepared.

Prototype Example 8

In Prototype Example 8, the carbon nanotubes in the kneaded resin material of Prototype Example 1 were deleted from the formulation to prepare the kneaded resin material. The subsequent shaping and removal of removable particles were performed similar to Prototype Example 1. In this way, the conductive interconnected porous film of Prototype Example 8 (thickness 300 μm) was prepared.

Prototype Example 9

In Prototype Example 9, the carbon nanotubes in the kneaded resin material of Prototype Example 1 were changed to a type with a large diameter (denier: 150 nm) to prepare the kneaded resin material which was then extruded by a T-die to obtain a film-shaped resin shaped article. After this, the same procedure was followed as in Prototype Example 2 to roll the material by a calender roll machine and remove the removable particles. In this way, the conductive interconnected porous film of Prototype Example 9 (thickness 200 μm) was prepared.

Prototype Example 10

In Prototype Example 10, a base material resin constituted by PP (1) which was frozen and crushed to a powder was used. A twin-screw kneading extruder was charged with PP (1): 22 parts by weight, carbon beads (diameter 150 μm): 19 parts by weight, carbon nanotubes: 12 parts by weight, and tapioca starch: 47 parts by weight. The mixture was heated to 140° C. to melt the base material resin. The ingredients were kneaded until uniformly dispersed to prepare the kneaded resin material. The kneaded resin material was extruded by a T-die to thereby obtain the film-shaped resin shaped article. This film-shaped resin shaped article was run through a calender roll machine which was set to a line pressure of 2 t/cm and heated to 130° C. to roll it and thereby make the film-shaped resin shaped article thinner. The removable particles were removed in the same way as in Prototype Example 1. In this way, the conductive interconnected porous film of Prototype Example 10 (thickness 250 μm) was prepared.

Prototype Example 11

In Prototype Example 11, the diameter 150 μm carbon beads in the kneaded resin material of Prototype Example 10 were changed to diameter 20 μm carbon beads to prepare the kneaded resin material. After this, the same procedure was followed as in Prototype Example 10 to extrude the material from a T-die to obtain a film-shaped resin shaped article. This was run through a calender roll machine to roll it, then the same procedure was followed as in Prototype Example 1 to remove the removable particles. In this way, the conductive interconnected porous film of Prototype Example 11 (thickness 110 μm) was prepared.

Prototype Example 12

In Prototype Example 12, the diameter 150 μm carbon beads in the kneaded resin material of Prototype Example 10 were changed to diameter 5 μm carbon beads to prepare the kneaded resin material. After that, the same procedure was followed as in Prototype Example 10 to extrude the material from a T-die to obtain a film-shaped resin shaped article. This was run through a calender rolling machine to roll it and the same procedure was followed as in Prototype Example 1 to remove the removable particles. In this way, the conductive interconnected porous film of Prototype Example 12 (thickness 100 μm) was prepared.

Prototype Example 13

In Prototype Example 13, the diameter 150 μm carbon beads in the kneaded resin material of Prototype Example 10 were changed to diameter 5 μm carbon beads and carbon nanotubes were deleted from the formulation to prepare the kneaded resin material. After this, the same procedure was followed as in Prototype Example 10 to extrude the material from a T-die to obtain a film-shaped resin shaped article. This was run through a calender roll machine to roll it, then the same procedure was followed as in Prototype Example 1 to remove the removable particles. In this way, the conductive interconnected porous film of Prototype Example 13 (thickness 100 μm) was prepared.

Prototype Example 14

In Prototype Example 14, a base material resin constituted by a thermoplastic fluororesin which was frozen and crushed to a powder was used. A twin-screw kneading extruder was charged with the fluororesin: 38 parts by weight, carbon beads (diameter 5 μm): 15 parts by weight, carbon nanotubes: 9 parts by weight, and tapioca starch: 38 parts by weight. The mixture was heated to 170° C. to melt the base material resin. The ingredients were kneaded until uniformly dispersed to prepare the kneaded resin material. The kneaded resin material was extruded by a T-die to obtain the film-shaped resin shaped article. This film-shaped resin shaped article was run through a calender roll machine which was set to a line pressure of 2 t/cm and which was heated to 150° C. to roll it and thereby obtain a film-shaped resin shaped article. The removable particles were removed in the same way as in Prototype Example 1. In this way, the conductive interconnected porous film of Prototype Example 14 (thickness 90 μm) was prepared.

Prototype Example 15

In Prototype Example 15, a base material resin constituted by PP (1) which was frozen and crushed to a powder was used and the carbon fiber (1) was changed to the carbon fiber (2). The carbon fiber (2) was higher in true density and better in electrical conductivity than the carbon fiber (1). A twin-screw kneading extruder was charged with PP (1): 25 parts by weight, carbon fiber (2): 31 parts by weight, carbon nanotubes: 14 parts by weight, and potato starch: 30 parts by weight. The mixture was heated to 170° C. to melt the base material resin. The ingredients were kneaded until uniformly dispersed to prepare the kneaded resin material. The kneaded resin material was extruded by a T-die, then immediately introduced between two metal rollers set to a line pressure of 2 t/cm and heated to 130° C. to form it into a film shape and then was cooled to thereby obtain the film-shaped resin shaped article. The removable particles were removed in the same way as in Prototype Example 1. In this way, the conductive interconnected porous film of Prototype Example 15 (thickness 50 μm) was prepared.

Prototype Example 16

In Prototype Example 16, a base material resin constituted by PP (2) which was frozen and crushed to a powder was used. A twin-screw kneading extruder was charged with PP (2): 25 parts by weight, carbon fiber (2): 31 parts by weight, carbon nanotubes: 14 parts by weight, and potato starch: 30 parts by weight. The mixture was heated to 180° C. to melt the base material resin. The ingredients were kneaded until uniformly dispersed to prepare the kneaded resin material. The kneaded resin material was extruded by a T-die, then immediately introduced between two metal rollers set to a line pressure of 2 t/cm and heated to 155° C. to form it into a film shape and then was cooled to thereby obtain the film-shaped resin shaped article. The removable particles were removed in the same way as in Prototype Example 1. In this way, the conductive interconnected porous film of Prototype Example 16 (thickness 50 μm) was prepared.

Prototype Example 17

In Prototype Example 17, the potato starch of the removable particles in the kneaded resin material of Prototype Example 15 was changed to tapioca starch to prepare the kneaded resin material. The subsequent shaping was also performed similar to Prototype Example 15. The removable particles were removed in the same way as Prototype Example 1. In this way, the conductive interconnected porous film of Prototype Example 17 (thickness 50 μm) was prepared.

Prototype Example 18

In Prototype Example 18, the removable particles in the kneaded resin material of Prototype Example 15 were made the two types of potato starch and tapioca starch to prepare the kneaded resin material. The weight of the starch itself was made the same as in Prototype Example 15 of 30 parts by weight so as to give a mixed weight ratio of potato starch of 24 parts by weight and tapioca starch of 6 parts by weight. The materials other than the starch and the formulation were made the same as in Prototype Example 15, and the subsequent shaping was also performed similar to Prototype Example 15. The starch of the removable particles was removed in the same way as in Prototype Example 1. In this way, the conductive interconnected porous film of Prototype Example 18 (thickness' 50 μm) was prepared.

Prototype Example 19

In Prototype Example 19, the first carbon particles in the kneaded resin material of Prototype Example 15 were changed from carbon fiber (1) to spherical graphite (10 μm) to prepare the kneaded resin material. The rest of the materials and formulation were made the same as in Prototype Example 15, and the subsequent shaping was also performed similar to Prototype Example 15. The starch of the removable particles was removed in the same way as in Prototype Example 1. In this way, the conductive interconnected porous film of Prototype Example 19 (thickness 50 μm) was prepared.

Prototype Example 20

In Prototype Example 20, the first carbon particles in the kneaded resin material of Prototype Example 15 were changed from carbon fibers (1) to spherical graphite (25 μm)

to prepare the kneaded resin material. The rest of the materials and formulation were made the same as in Prototype Example 15, and the subsequent shaping was also performed similar to Prototype Example 15. The starch of the removable particles was removed in the same way as in Prototype Example 1. In this way, the conductive interconnected porous film of Prototype Example 20 (thickness 50 μm) was prepared.

Thickness

A Citizen Watch-made MEI-10 JIS type paper thickness measuring device was used to measure the thickness of 10 superposed sheets of each of the films of the prototype examples. The thickness per sheet (μm) was then calculated.

Bending Quality

The film of each prototype example was cut to 3 μm×3 cm and bent from the initial flat state to a right angle state. Prototype examples with no change at all after bending were evaluated as W. Prototype examples with some cracks at the time of bending were evaluated as "B". Prototype examples which could not be bent or which broke were evaluated as "C".

Gas Permeability

Based on JIS P 8117 (2009) {Paper and Board-Determination of Air Permeance and Air Resistance (Medium Range)-Gurley method}, a Toyo Seiki-made Gurley type Densometer G-B2C Type was used for measurement. Further, the time required for permeation of air (sec) was measured.

Resistivity

Based on JIS K 7194 (1994) {Testing Method for Resistivity of Conductive Plastics With a Four-Point Probe Array}, a Mitsubishi Chemical Analytec-made low resistivity meter Loresta GP MCP-T610 Type, PSP probe was used to measure the resistivity (Ω·cm).

Overall Evaluation

The different measurement items and evaluations were considered all together to evaluate if the conductive interconnected porous films had suitable performances. Prototype examples with performances recognized as good were evaluated as "A", prototype examples with performances recognized as usual were evaluated as "B", and non-allowable prototype examples were evaluated as "C". The materials, formulations, physical properties, and evaluations of the prototype examples are shown in the following Tables 1 to 4.

TABLE 1

|  | Prototype Example 1 | Prototype Example 2 | Prototype Example 3 | Prototype Example 4 | Prototype Example 5 |
| --- | --- | --- | --- | --- | --- |
| Base material resin | LLDPE | LLDPE | LLDPE | LLDPE | LLDPE |
| First carbon particles (Large size carbon particles) | Carbon fiber (1) (Denier 11 μm) | Carbon fiber (1) (Denier 11 μm) | Carbon fiber (1) (Denier 11 μm) | Carbon fiber (1) (Denier 11 μm) | Carbon fiber (1) (Denier 11 μm) |
| Second carbon particles (Micro size carbon particles) | Carbon nanotubes (Diameter 10 nm) | Carbon nanotubes (Diameter 10 nm) | Carbon nanotubes (Diameter 10 nm) | Carbon nanotubes (Diameter 10 nm) | Carbon black (Diameter 34 nm) |
| Removable particles | Potato starch | Potato starch | Potato starch | Potato starch | Potato starch |
| Ratio (wt %) | 22/21/10/47 | 22/21/10/47 | 22/21/10/47 | 25/14/11/50 | 22/21/10/47 |
| Thickness (μm) | 1000 | 170 | 80 | 800 | 80 |
| Bending quality | A | A | A | A | B |
| Gas permeability (sec) | 31 | 5 | 0.6 | 56 | 19 |
| Resistivity (Ω·cm) | 0.09 | 0.09 | 0.09 | 0.40 | 0.28 |
| Overall evaluation | A | A | A | A | B |

TABLE 2

|  | Prototype Example 6 | Prototype Example 7 | Prototype Example 8 | Prototype Example 9 | Prototype Example 10 |
| --- | --- | --- | --- | --- | --- |
| Base material resin | LLDPE | LLDPE | LLDPE | LLDPE | PP(1) |
| First carbon particles (Large size carbon particles) | — | Carbon fiber (1) (Denier 11 μm) | Carbon fiber (1) (Denier 11 μm) | Carbon fiber (1) (Denier 11 μm) | Carbon beads (Diameter 150 μm) |
| Second carbon particles (Micro size carbon particles) | Carbon nanotubes (Diameter 10 nm) | Carbon nanotubes (Diameter 10 nm) | — | Carbon nanotubes (Diameter 150 nm) | Carbon nanotubes (Diameter 10 nm) |
| Removable particles | Potato starch | — | Potato starch | Potato starch | Tapioca starch |
| Ratio (wt %) | 22/0/31/47 | 42/36/22/0 | 22/31/0/47 | 22/21/10/47 | 22/19/12/47 |
| Thickness (μm) | 400 | 300 | 300 | 200 | 250 |
| Bending quality | B | A | A | A | A |
| Gas permeability (sec) | 26 | 1000 or more | 22 | 6 | 180 |
| Resistivity (Ω·cm) | 0.66 | 0.06 | 3.0 | 0.17 | 0.12 |
| Overall evaluation | C | C | C | B | B |

TABLE 3

|  | Prototype Example 11 | Prototype Example 12 | Prototype Example 13 | Prototype Example 14 | Prototype Example 15 |
|---|---|---|---|---|---|
| Base material resin | PP(1) | PP(1) | PP(1) | Fluororesin | PP(1) |
| First carbon particles (Large size carbon particles) | Carbon beads (Diameter 20 μm) | Carbon beads (Diameter 5 μm) | Carbon beads (Diameter 5 μm) | Carbon beads (Diameter 5 μm) | carbon fiber (2) (Denier 11 μm) |
| Second carbon particles (Micro size carbon particles) | Carbon nanotubes (Diameter 10 nm) | Carbon nanotubes (Diameter 10 nm) | — | Carbon nanotubes (Diameter 10 nm) | Carbon nanotubes (Diameter 10 nm) |
| Removable particles | Tapioca starch | Tapioca starch | Tapioca starch | Potato starch | Potato starch |
| Ratio (wt %) | 22/19/12/47 | 22/19/12/47 | 22/31/0/47 | 38/15/9/38 | 25/31/14/30 |
| Thickness (μm) | 110 | 100 | 100 | 90 | 50 |
| Bending quality | A | A | A | A | A |
| Gas permeability (sec) | 176 | 72 | 12 | 6 | 0.8 |
| Resistivity (Ω · cm) | 0.12 | 0.14 | 40 | 0.09 | 0.07 |
| Overall evaluation | B | A | C | A | A |

TABLE 4

|  | Prototype Example 16 | Prototype Example 17 | Prototype Example 18 | Prototype Example 19 | Prototype Example 20 |
|---|---|---|---|---|---|
| Base material resin | PP(2) | PP(1) | PP(1) | PP(1) | PP(1) |
| First carbon particles (Large size carbon particles) | Carbon fiber (2) (Denier 11 μm) | Carbon fiber (2) (Denier 11 μm) | Carbon fiber (2) (Denier 11 μm) | Spherical graphite (Diameter 10 μm) | Spherical graphite (Diameter 25 μm) |
| Second carbon particles (Micro size carbon particles) | Carbon nanotubes (Diameter 10 nm) | Carbon nanotubes (Diameter 10 nm) | Carbon nanotubes (Diameter 10 nm) | Carbon nanotubes (Diameter 10 nm) | Carbon nanotubes (Diameter 10 nm) |
| Removable particles | Potato starch | Tapioca starch | Tapioca starch Potato starch | Potato starch | Potato starch |
| Ratio (wt %) | 25/31/14/30 | 25/31/14/30 | 25/31/14/(24 + 6) | 25/31/14/30 | 25/31/14/30 |
| Thickness (μm) | 50 | 50 | 50 | 50 | 50 |
| Bending quality | A | A | A | B | B |
| Gas permeability (sec) | 0.9 | 60 | 34 | 0.6 | 0.8 |
| Resistivity (Ω · cm) | 0.05 | 0.07 | 0.07 | 0.05 | 0.05 |
| Overall evaluation | A | A | A | B | B |

Considerations

From the series of prototypes, the thickness of the conductive interconnected porous film can be adjusted by the method of formation. For this reason, it was possible to selectively make films of 50 μm to 1000 μm. From this, it is possible to meet the demand for realizing thinner films. Further, this can be converted for use for forming general resin films and methods of forming the same, so it is possible to easily make the film surface smooth.

As shown in Prototype Examples 6, 7, 8, and 13, when even one type is missing, the performance which is sought from the conductive interconnected porous film ends up deteriorating and breakage (missing) results. Therefore, blending in two types of carbon particles with mutual different particle sizes is essential. Further, blending in removable particles is essential since if not, a porous structure cannot be achieved.

The type of the resin does not have a particularly large effect, so as long as the melting or other treatment is easy, use of a wide range of types may be possible. Further, from Prototype Examples 10 and 11, when making the first carbon particles (large size carbon particles) particles of a large size, the gas permeability falls. From this, it is estimated that a size of the large size carbon particles of 5 to 25 μm or so is suitable.

If taking note of the removable particles which are mixed into the base material resin from a comparison of Prototype Examples 15 and 17, tapioca starch is smaller in particle size compared with potato starch. Therefore, when mixing in starch in amounts of equal weight, the inside diameters of the cells which are derived from the tapioca starch become smaller compared with the potato starch. That is, the channels for air at the time of permeation become finer and more complex. The gas permeability falls by that amount. However, the diffusion of the gas etc. in the film is improved. Therefore, what kind of cells to form can be suitably selected in accordance with the applied locations, conditions, etc.

Further, Prototype Example 18 is an example of using different types of removable particles to form cells. This results in a medium extent of gas permeability. Therefore, it is possible to freely control the permeation and diffusion of gases etc. which pass through the inside of the film.

As shown in Prototype Examples 15 to 20, the film itself can be formed thin. By doing this, the applications of the conductive interconnected porous film can be further expanded.

Summarizing the industrial applicability, the conductive interconnected porous film of the present invention satisfies the requirements of a good conductivity, good gas permeability, surface smoothness, corrosion resistance, and low impurities and is provided with the new characteristics of being strong in bending and excellent in handling. Therefore, for example, it is promising as a material which forms a gas diffusion layer which is used in a solid polymer type fuel cell. Of course, it can naturally be used for various other applications which require the properties of the present invention.

DESCRIPTION OF NOTATIONS 1, 1x, 1y conductive interconnected porous film
10, 10x, 10y resin base material part
15 cell structure
20 porous interconnected cell structure
21 cells
22 connecting parts
23 small cells
25 removable particulate matter
31 first carbon particles (first carbon material)
32 second carbon particles (second carbon material)
33, 35 large size carbon particles (large carbon material)
34 micro size carbon particles (micro size carbon material)

The invention claimed is:

1. A conductive interconnected porous film, comprising:
a resin base material part,
wherein the resin base material part has a porous interconnected cell structure which is formed by removal of removable particulate matter,
said resin base material part is comprised of first carbon particles and second carbon particles of different particle sizes mixed together,
said first carbon particles have a diameter of 5 μm or more and are carbon fiber or spherical graphite particles, and
said second carbon particles have a diameter of 10 nm or more and are carbon nanotube particles,
the time required for permeation of air of the conductive interconnected porous film is 72 seconds or less,
the resistivity of the conductive interconnected porous film is 0.4 Ω·cm or less, and
the thickness of the conductive interconnected porous film is 50 μm to 1000 μm.

2. The conductive interconnected porous film according to claim 1 wherein said resin base material part is a thermoplastic resin.

3. The conductive interconnected porous film according to claim 2 wherein said thermoplastic resin is selected from the group consisting of an ethylene homopolymer, propylene homopolymer, random copolymer of ethylene and propylene, 1-butene, 1-pentene, 1-hexene, 4-methyl-1-pentene and fluororesins.

4. The conductive interconnected porous film according to claim whet said porous interconnected cell structure has cells of sizes of 10 μm to 50 μm.

5. The conductive interconnected porous film according to claim 4 wherein said cells include at least two types of cells of different sizes.

6. A method of producing a conductive interconnected porous film, the method comprising:
a kneading step of kneading a base material resin, removable particulate matter, and first carbon particles and second carbon particles of mutually different particle sizes to obtain a kneaded resin material, wherein said first carbon particles have a diameter of 5 μm or more and are carbon fiber or spherical graphite particles, and said second carbon particles have a diameter of 10 nm or more and are carbon nanotube particles,
a shaping step of shaping said kneaded resin material into a film-shaped resin shaped article, and
a removal step of removing said removable particulate matter from said film-shaped resin shaped article to obtain a cell structure,
wherein the time required for permeation of air of the conductive interconnected porous film is 72 seconds or less,
the resistivity of the conductive interconnected porous film is 0.4 Ω·cm or less, and
the thickness of the conductive interconnected porous film is 50 μm to 1000 μm.

7. The method of producing a conductive interconnected porous film according to claim 6, wherein said removable particle matter is comprised of water-soluble particles which are removed by inclusion of water.

8. The method of producing a conductive interconnected porous film according to claim 6, wherein said removable particle matter is comprised of starch particles which are removed by enzymatic decomposition.

9. The method of producing a conductive interconnected porous film according to claim 6, wherein said base material resin is a thermoplastic resin.

10. The method of producing a conductive interconnected porous film according to claim 9, wherein said thermoplastic resin is selected from the group consisting of an ethylene homopolymer, propylene homopolymer, random copolymer of ethylene and propylene, 1-butene, 1-pentene, 1-hexene, 4-methyl-1-pentene and fluororesins.

* * * * *